Sept. 22, 1959  R. A. HEISING  2,905,343
DISCHARGE CONTROL FOR HARVESTER
Filed Aug. 26, 1957  2 Sheets-Sheet 1

INVENTOR.
R. A. HEISING

Sept. 22, 1959  R. A. HEISING  2,905,343
DISCHARGE CONTROL FOR HARVESTER
Filed Aug. 26, 1957  2 Sheets-Sheet 2
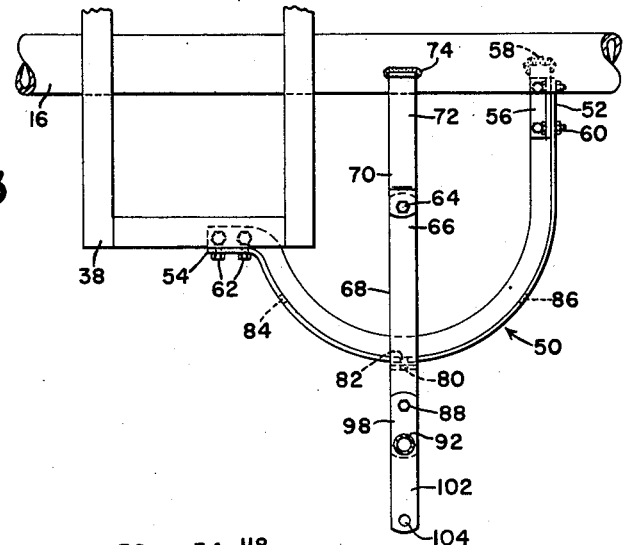
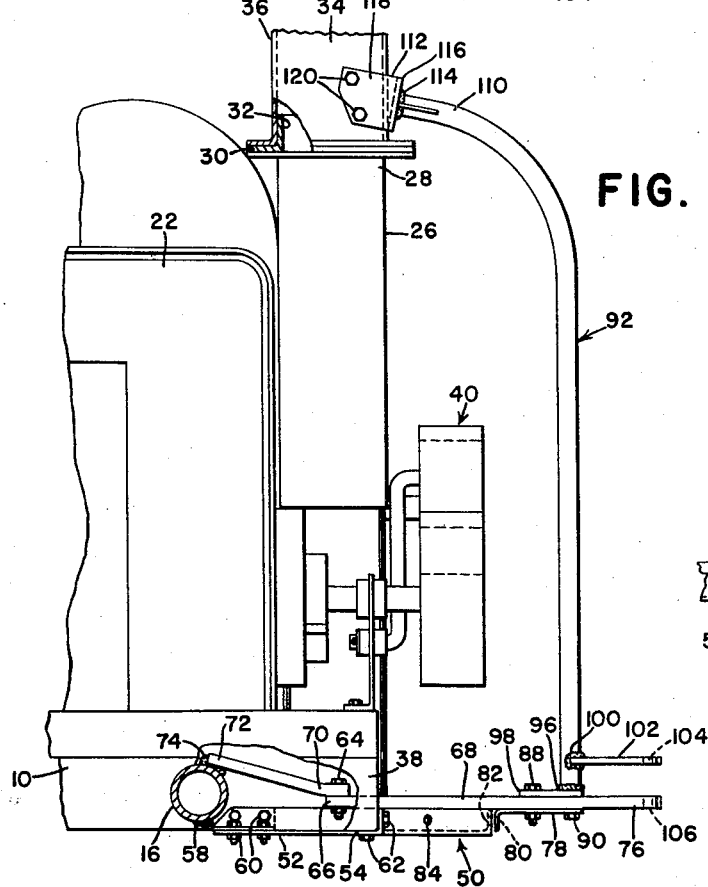
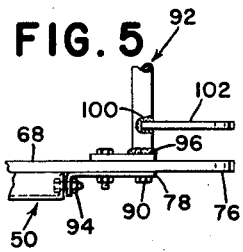
INVENTOR.
R. A. HEISING

United States Patent Office 2,905,343
Patented Sept. 22, 1959

2,905,343

DISCHARGE CONTROL FOR HARVESTER

Robert A. Heising, Ottumwa, Iowa, assignor, by mesne assignments, to Deere & Company, a corporation of Delaware Application August 26, 1957, Serial No. 680,092

1 Claim. (Cl. 214—42)

This invention relates to an agricultural implement and more particularly to a harvester and hitch and elevator discharge control means therefor.

In a typical agricultural vehicular train, such as that represented by a tractor, a trailing harvester and a trailer connected in trailing relation to the harvester, the general arrangement is such that crops harvested by the harvester are discharged rearwardly into the trailer. It is recognized that when the train turns a corner or otherwise changes lateral direction, the discharge spout on the harvester, if rigid with the harvester, will swing laterally away from the wagon and the discharge will miss the wagon. Several proposals have heretofore been advanced for causing the discharge spout to follow the wagon so that the crop discharge always enters the wagon regardless of the angular position between the wagon and the harvester.

The general object of the present invention is to provide improved means for controlling the swinging of a discharge spout for overcoming the problem noted above. It is an important feature of the present invention that the discharge control means is part of hitch means for connecting the trailing vehicle to the harvester, thereby obviating connections between the spout and the trailer. The invention features a simply constructed device having relatively few parts and especially designed for adaptation to existing machines. Other objects of the invention reside in means for sustaining the hitch and control device wholly on the harvester, a novel form of clevis connection, and a novel connection between the control device and the discharge spout.

The foregoing and other important objects and desirable features inherent in and encompassed by the invention will become apparent as a preferred embodiment thereof is disclosed in detail in the ensuing specification and accompanying sheets of drawings, the several figures of which are described below.

Fig. 3 is a fragmentary view as seen generally along the line 3—3 of Fig. 2.

Fig. 4 is a fragmentary view, partly in section, as seen along the line 4—4 of Fig. 2.

Fig. 5 is a fragmentary elevation of a portion of Fig. 4 but showing means for locking the hitch and spout control device against lateral swinging.

Figure 1:
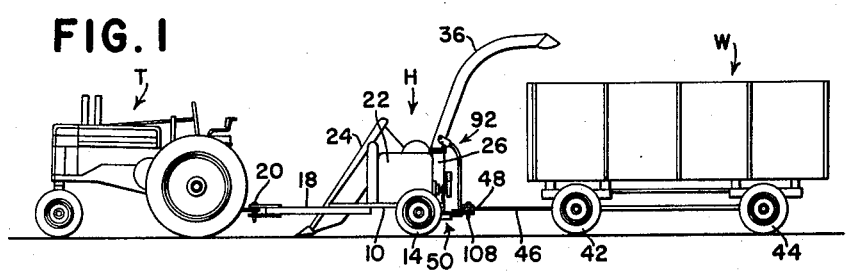
Fig. 1 is a general view, on a materially reduced scale, illustrating a typical vehicular train of the character noted.

In Fig. 1, the vehicular train will be recognized as being made up of a conventional farm tractor T, a harvester H and a trailer or trailing vehicle W. The harvester may be similar to that shown in the U. S. patent to Tuft 2,507,742, but the details of the machine are not a limitation on the broader aspects of the invention. This harvester has a mobile main frame 10 supported by right and left hand wheels 12 and 14 mounted on opposite ends of a transverse axle structure 16. The frame further has a forwardly extending draft tongue 18 connected by a typical clevis connection 20 to the tractor T. The harvester frame 10 supports a power plant 22 for driving a crop gatherer unit 24 and a rotary crop elevator device including a circular housing 26. The housing is rear mounted as respects the gatherer 24 and crops gathered by the gatherer are delivered rearwardly to the housing 26 for discharge tangentially and upwardly therefrom via an outlet 28, the upper portion of which is externally flanged at 30 to afford a swivel 32 on which the lower end portion 34 of a discharge spout 36 is mounted. The spout extends upwardly and rearwardly in overhanging relationship to the forward end of the wagon W.

Figure 2:
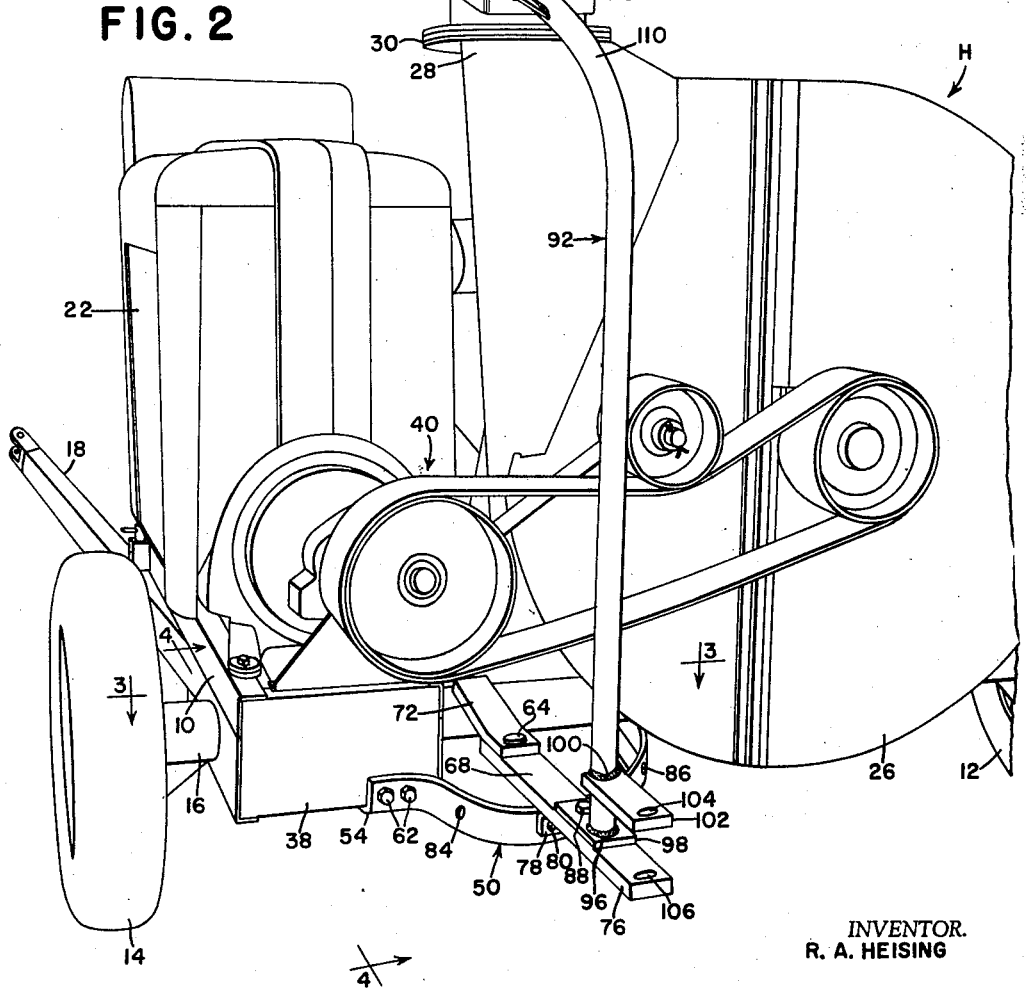
Fig. 2 is an enlarged rear perspective view of the harvester equipped with the hitch means and spout control device.

As best shown in Fig. 2, the elevator device housing 26 is laterally offset to the right hand side of the harvester frame 10, which disposes the outlet 28 generally on the fore-and-aft centerline of the machine. A rear part of the frame 10, as at 38, is laterally offset to the opposite side of the fore-and-aft centerline of the machine and thus is laterally offset from and is below the level of the outlet 28. This frame part serves to support part of the drive for operating the rotary device in the housing 26, this drive being indicated in its entirety by the numeral 40.

The trailer W is or may be of conventional construction, having front and rear wheels 42 and 44, and the front wheels are steerable by a laterally swingable forwardly extending draft tongue 46, the forward end of which at 48 is proximate to the rear end of the harvester H. In a conventional machine, the trailer tongue 46 would be connected directly to the rear of the harvester and the swivel connection at 32 between the spout 36 and the rotary device outlet 28 would be locked so that the spout would assume the normal rearward position as shown in Fig. 1. As previously mentioned, the defect in this arrangement is that on corners the spout becomes misalined with the wagon and discharges to the ground.

According to the present invention, means for controlling the spout has been provided and incorporated with hitch means for effecting a draft connection to the wagon. One feature of this arrangement is that the hitch means and spout control device is of unitary construction and is mounted solely on the harvester H without any connection to the trailer W except the draft connection to the forward end 48 of the trailer tongue 46.

The improved structure comprises basically a support, here of arcuate shape and indicated in its entirety by the numeral 50, and has opposite terminal end portions 52 and 54 secured respectively to the axle structure 16 and rear frame part 38 (Fig. 3). The means for effecting affixation of the terminal end portion 52 to the axle structure 16 comprises a bracket 56 rigidly secured to the axle structure as by welding at 58. Bolts 60 secure the end portion 52 to the bracket 56. The means for affixation of the other end 54 to the frame part 38 is here shown as comprising a plurality of bolts 62. The support 50 extends mainly to the rear and is arcuate about a center established here by a pivot means or pivot pin 64 which is generally coaxial with the swivel axis of the swivel connection 32 between the spout 36 and outlet 28.

The pivot pin 64 effects a connection between the front end 66 of a fore-and-aft drawbar 68 and the rear end 70 of a rigid drawbar mount 72 affixed to the axle 16 as by welding at 74. The drawbar is thus laterally swingable about the pivot pin 64 and extends rearwardly over and is sustained by the support 50 against downward deflection, terminating in a terminal rear end portion 76 which affords part of clevis means for connection to the trailer tongue 46 in a manner to be presently described.

As best shown in Figs. 3 and 4, the support 50 is of angle section and the drawbar 68 rides the upper edge of the upright flange thereof. The rear portion of the drawbar has at its underside an L-shaped member 78 having an aperture 80 registrable selectively with any one of three apertures 82, 84 and 86 in the support 50. The member 78 is secured to the underside of the drawbar by a bolt 88 and a cap screw 90, the latter in this case serving as means for mounting on the drawbar an upright spout control device or standard means indicated in its entirety by the numeral 92. This device is rigid with the drawbar and therefore laterally swingable with the drawbar. For purposes of locking the drawbar to the support 50, releasable means such as a bolt 94 (Fig. 5) may be used.

The standard means 92 is preferably a single tubular member preferably welded at 96 at its lower end to a strap or plate 98 which is secured to the drawbar by the previously described bolt 88. The cap screw 90 passes upwardly through the plate 98 and into the lower end of the standard means. Any suitable equivalent mounting may be substituted for that disclosed. Rigidly secured to the standard means, as by welding at 100, is a rearwardly extending member or element 102 spaced closely above the terminal rear end portion 76 of the drawbar. This member and the terminal rear end of the drawbar are apertured in alinement at 104 and 106 respectively to afford part of hitch means completed by a clevis pin 108 (Fig. 1), thus affording an articulate draft connection to the trailer.

The standard means extends upwardly and is then directed forwardly at 110 to establish an upper portion thereof in proximity to the lower end 34 of the spout 36. Spout-engaging means 112 is rigidly secured to the upper end portion 110 of the standard means, again welding being preferably employed as indicated at 114. The spout-engaging means 112 is of U-shaped construction, having its bight 116 secured to the upper end portion 110 of the standard means and having opposite forwardly extending legs 118 embracing the lower end 34 of the spout from the rear. Cap screws 120 are shown as suitable means for securing the legs 118 to diametrically opposite sides of the spout 34.

In normal operation, especially when it is desired to control the spout on corners or on turns as in contour operation, the releasable lock means 94 is removed so that the drawbar and standard means are free to swing about the coaxial pivot axis through 32—64. Since the standard and drawbar swing in unison, and since the standard is connected to the spout, the spout will also swing and, as the angular position of the wagon and harvester change, the spout will remain in discharging relationship to the wagon. As already indicated, the invention features the provision of the hitch means and spout control device as a unitary structure mounted wholly on the harvester and independent of the wagon except for the clevis connection 108 to the wagon tongue. Hence, when the wagon is full and it is desired to substitute another wagon, it is necessary only to remove the clevis pin 108. In addition the structure is simple and rigid and being mounted on the harvester alone becomes in effect a part thereof and the harvester can be operated without the wagon, the unitary structure obviating prior defects in relatively cumbersome and unwieldy structure overhanging at the rear of the harvester.

The structure is easy to attach and dismount and, because of its simplicity, it is relatively easy to maintain.

Another advantage is that the drawbar, in addition to being centrally lockable at 94—82, can be locked to either side of center by the lock bolt 94 and either of the holes 84 or 86. Since the standard means 92 effects a connection between the drawbar and spout, the angular position of the spout can be selected, as when trailing the trailer W to one side or the other of the fore-and-aft centerline of the machine. If desired, bolts can be placed in the holes 84 and 86, without passing through 80, and these will serve as stops to limit swinging of the drawbar. On the basis of what is disclosed, additional bolts may be provided to increase the foregoing possibilities and to afford others.

Feature and advantages in addition to those enumerated will readily occur to those versed in the art, as will modifications and alterations in the preferred embodiment disclosed, all of which may be achieved without departure from the spirit and scope of the invention.

What is claimed is:

For a harvester having a rear-mounted crop elevator device provided with a discharge spout having a lower portion coaxially swivelled on a vertical axis and an upper portion extending upwardly and rearwardly from the harvester, and a fore-and-aft drawbar pivotally connected at its front end to the harvester generally coaxially with the discharge spout for lateral swinging, the improvement comprising: rigid standard means having a lower plate for rigid affixation to the drawbar adjacent to the rear end portion thereof to sustain said standard means in upright position in rearwardly spaced relation to the elevator device and to carry said standard means for lateral swinging with the drawbar, said standard means having an upper end portion extending forwardly for disposition in proximity to the lower portion of the spout; means on said upper end portion engaging the lower portion of the spout for causing the spout to swivel on the harvester in unison with lateral swinging of the drawbar; and a rearwardly extending member rigid on the lower portion of the standard means and above the level of the lower plate for disposition in closely spaced relation above the rear end of the drawbar to combine with said rear end to afford a clevis.

References Cited in the file of this patent

UNITED STATES PATENTS

| | | |
|---|---|---|
| 1,306,462 | Bergerud | June 10, 1919 |
| 2,702,193 | Taylor et al. | Feb. 15, 1955 |
| 2,789,705 | Eberly | Apr. 23, 1957 |
| 2,864,517 | Dickenshied | Dec. 16, 1958 |